United States Patent
Ghelichi et al.

(10) Patent No.: US 12,426,029 B2
(45) Date of Patent: *Sep. 23, 2025

(54) THERMAL MITIGATION IN USER EQUIPMENT HAVING MULTIPLE COMMUNICATION MODULES

(71) Applicant: QUALCOMM Incorporated, San Diego, CA (US)

(72) Inventors: Mahbod Ghelichi, San Diego, CA (US); James Francis Geekie, Carlsbad, CA (US); Raghu Narayan Challa, San Diego, CA (US); Mihir Vijay Laghate, San Diego, CA (US); Ruhua He, San Diego, CA (US); Yong Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/539,039

(22) Filed: Dec. 13, 2023

(65) Prior Publication Data

US 2024/0114497 A1    Apr. 4, 2024

Related U.S. Application Data

(63) Continuation of application No. 17/350,794, filed on Jun. 17, 2021, now Pat. No. 12,289,713.

(51) Int. Cl.
*H04W 72/0453* (2023.01)
*G01K 3/00* (2006.01)
(Continued)

(52) U.S. Cl.
CPC ........ *H04W 72/0453* (2013.01); *G01K 3/005* (2013.01); *H04W 72/51* (2023.01); *H04W 72/541* (2023.01); *H04W 88/02* (2013.01)

(58) Field of Classification Search
CPC ............. H04W 72/0453; H04W 72/51; H04W 72/541; H04W 72/542; H04W 88/02;
(Continued)

(56) References Cited

U.S. PATENT DOCUMENTS 8,170,606 B2    5/2012    Dorsey et al.
11,751,182 B2   9/2023    Ioffe et al.
(Continued)

FOREIGN PATENT DOCUMENTS

WO    2013185004 A1   12/2013
WO    2021011658 A1    1/2021

OTHER PUBLICATIONS

International Search Report and Written Opinion—PCT/US2022/072908—ISA/EPO—Oct. 5, 2022.

*Primary Examiner* — Noel R Beharry
*Assistant Examiner* — Angelie T Ngo
(74) *Attorney, Agent, or Firm* — Patterson + Sheridan, L.L.P.

(57) ABSTRACT

In some aspects, the present disclosure provides methods, apparatuses, and systems for efficient thermal mitigation while maintaining wireless device performance on a primary component carrier (PCC). Embodiments described may include implementation of target transceiver module configurations, where bandwidth (e.g., PCC bands and secondary component carrier (SCC) bands) may be monitored by a wireless device based on intra-module target configurations and/or inter-module target configurations. An intra-module target configuration may include a target transceiver module monitoring both PCC bands and SCC bands. An inter-module target configuration may include or refer to a plurality of target transceiver modules together monitoring PCC bands and SCC bands. In scenarios where operating temperatures exceed temperature thresholds, target transceiver module configurations may be implemented to transition
(Continued)

PCC bands, SCC bands, or both, from a PCC-resident transceiver module to another transceiver module to reduce the operating temperatures of concern. Various additional and alternative aspects are described herein.

26 Claims, 10 Drawing Sheets

(51) Int. Cl.
     *H04W 72/51*     (2023.01)
     *H04W 72/541*     (2023.01)
     *H04W 88/02*     (2009.01)

(58) Field of Classification Search
     CPC ...... G01K 3/005; H04B 1/005; H04B 1/0064; H04B 1/036; H04B 1/40; G06F 1/206; H04L 5/001; H04M 2250/02
     See application file for complete search history.

(56) References Cited

U.S. PATENT DOCUMENTS

| | | |
|---|---|---|
| 2015/0043156 A1 | 2/2015 | Jain et al. |
| 2019/0094929 A1 | 3/2019 | Geekie et al. |
| 2020/0007540 A1 | 1/2020 | Kawaguchi et al. |
| 2020/0022095 A1 | 1/2020 | Kim et al. |
| 2020/0100099 A1 | 3/2020 | Tenny et al. |
| 2020/0128479 A1* | 4/2020 | Xu ................ H04W 24/00 |
| 2021/0067182 A1 | 3/2021 | Ravi et al. |
| 2021/0195439 A1 | 6/2021 | Prabhakar et al. |
| 2021/0258224 A1 | 8/2021 | Van Der Velde |
| 2022/0302970 A1 | 9/2022 | Stauffer et al. |
| 2022/0322339 A1 | 10/2022 | Park et al. |
| 2022/0352627 A1* | 11/2022 | Eder ................ H01Q 3/34 |
| 2022/0408436 A1 | 12/2022 | Ghelichi et al. |
| 2023/0163821 A1 | 5/2023 | Ho et al. |
| 2023/0216557 A1 | 7/2023 | Woo et al. |

\* cited by examiner

THERMAL MITIGATION IN USER EQUIPMENT HAVING MULTIPLE COMMUNICATION MODULES

INTRODUCTION CLAIM OF PRIORITY UNDER 35 U.S.C. § 119

This application is a continuation of U.S. patent application Ser. No. 17/350,794, filed Jun. 17, 2021, which is herein incorporated by reference in its entirety.

INTRODUCTION

Aspects of the present disclosure relate to wireless communications, and more particularly, to techniques for thermal mitigation in user equipment having multiple communication modules.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

In one aspect, a method includes determining one or more operating temperatures of a user equipment; determining a target configuration for a plurality of transceiver modules based on the one or more operating temperatures; implementing the target configuration for the plurality of transceiver modules; and performing wireless communications according to the target configuration for the plurality of transceiver modules.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Figure 1:
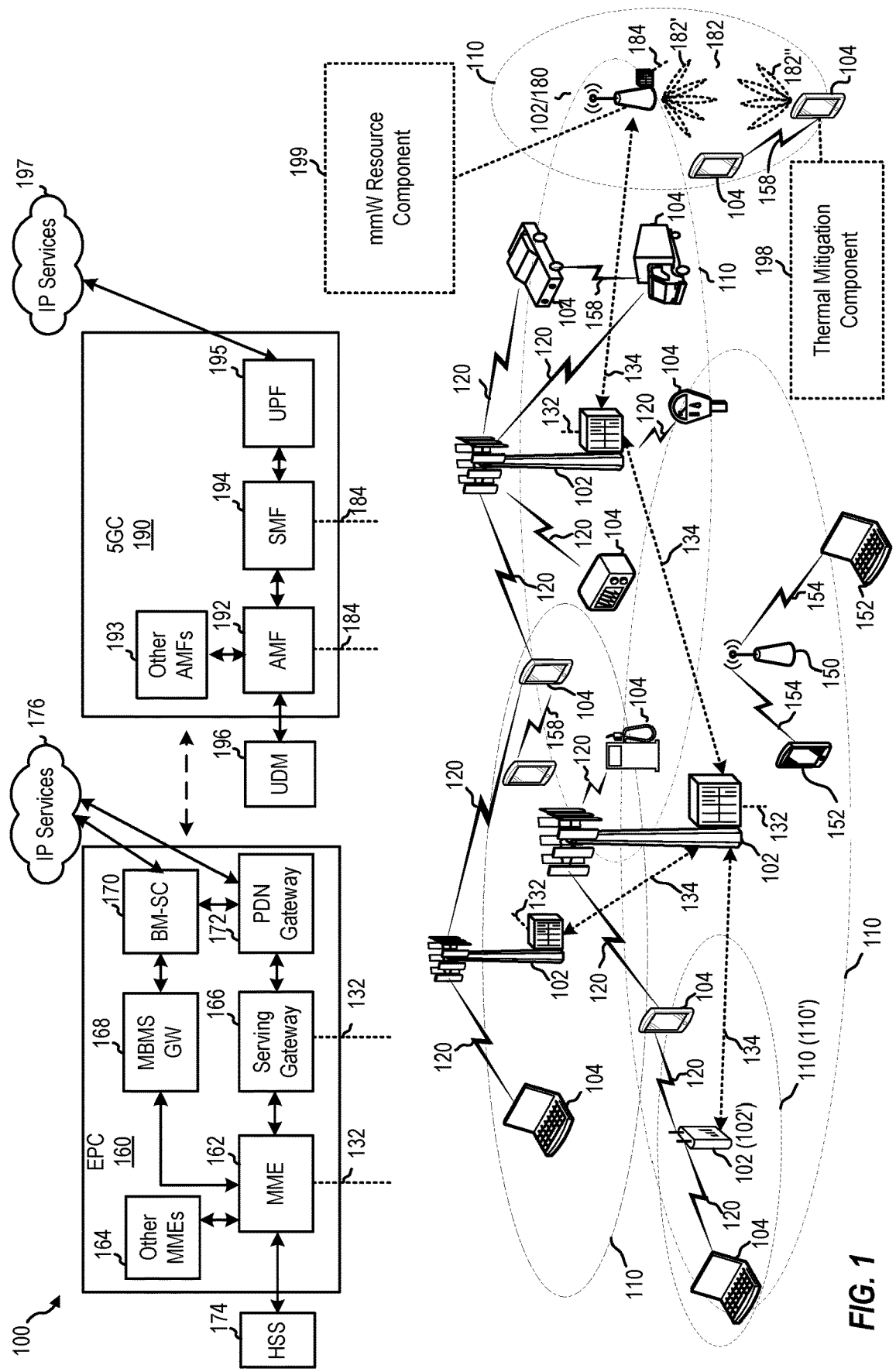
FIG. 1 is a block diagram conceptually illustrating an example wireless communication network.

Aspects of the present disclosure provide apparatuses, methods, processing systems, and computer-readable mediums for thermal mitigation in user equipments (UEs) having multiple communication modules, such as millimeter wave (mmWave) transceiver modules.

Modern wireless communication devices (e.g., UEs) are able to leverage ever-wider ranges of wireless spectrum, including ultra-high frequency millimeter wave spectrum, in order to increase wireless communication performance (e.g., to increase data rates). However, as certain capabilities increase, such as the ability to transmit and receive high-frequency communications, so too does power usage and heat generation, which are generally detrimental to device performance. Accordingly, managing the temperature of wireless electronic devices is an important design consideration that can affect overall device performance and user experience.

For example, current leakage, battery resource drain, user safety concerns, reduced performance, etc. may arise when adequate thermal management techniques are not implemented in a wireless communication device. In some cases, operating temperatures can increase to the point where internal circuitry starts to malfunction, or where other elements of the device are damaged (e.g., thermal warping, delamination, etc.), to name just a few problems. Accordingly, effective thermal mitigation, while maintaining satisfactory device performance, is desirable.

Wireless communication devices may employ various thermal management techniques to prevent and mitigate generation of excessive heat during use. For example, passive cooling devices, active cooling devices, and/or spatial arrangement of electronic packaging may be used. Wireless communication devices may also rely on various temperature sensors embedded within the device to monitor operating temperatures and to change operational characteristics to reduce thermal load.

Aspects described herein relate to controlling the operation of multiple communication modules, such as mmWave transceiver modules or other transceiver modules, based on various operational temperatures of a wireless communication device. For example, in certain aspects, a wireless communication device may be configured to determine one or more transceiver modules to use for bandwidth monitoring based on one or more device operating temperatures, such as a surface temperature, a junction temperature, a module temperature, etc. To this end, a wireless communication device may include a plurality of temperature sensing devices, such as thermistors and other temperature sensing modules, to determine relevant operating temperatures.

In some aspects described herein, thermal mitigation techniques are configured to control which of a plurality of transceiver modules (e.g., mmWave transceiver modules) is used for a particular wireless communication task, such as monitoring various component carriers. In particular, such techniques may control the module on which a primary component carrier (PCC) is monitored in order to maintain an active connection to a network, such as a 5G network, an example of which is described below with respect to FIG. 1. Beneficially, such thermal mitigation techniques may improve a 5G network lifecycle, maintain data throughput, improve communication link performance, and protect the device and user from dangerous thermal conditions.

Aspects described herein may implement target transceiver module configurations in which bandwidths (e.g., PCC bands and secondary component carrier (SCC) bands) are monitored by a wireless communication device based on intra-module target configurations and/or inter-module target configurations. An intra-module target configuration may generally refer to a target transceiver module monitoring both PCC bands and SCC bands at once. An inter-module target configuration, on the other hand, may generally refer to two or more transceiver modules monitoring PCC bands and SCC bands independently (e.g., PCC bands being monitored by a first transceiver module and SCC bands being monitored by a second transceiver module).

The various target transceiver module configurations may be implemented when, for example, user equipment operating temperatures exceed temperature thresholds, such as in cases where a transceiver module temperature exceeds a transceiver module or junction temperature threshold and/or where a case or "touch" temperature of a wireless communication device exceeds a case or touch temperature threshold. In various aspects described herein, a target transceiver module configuration may be implemented to transition PCC bands, SCC bands, or both, from a PCC-resident transceiver module to another transceiver module in order to reduce the operating temperatures of concern. Consequently, the performance of transceiver modules monitoring PCC bands may be increased while thermal mitigation techniques detrimental to performance (e.g., such as antenna element disablement, early 5G termination, peak throughput reduction, etc.) may be beneficially avoided.

It should be noted that while certain examples are described herein as allocating bandwidth monitoring between two transceiver modules, the same principles may be applied for allocating resource monitoring between any number of transceiver modules of any type of radio technology. Further, though certain aspects are described herein as allocating resource monitoring between multiple transceiver modules for monitoring specific carriers (e.g., PCC bands and SCC bandwidths), the same principles may be applied for allocating resource monitoring between multiple transceiver modules for different resources, such as time resources, frequency resources, etc.

Introduction to Wireless Communication Networks

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes mmW resource component 199, which may be configured to communicate with the UEs over non-contiguous bandwidth allocations. Wireless network 100 further includes thermal mitigation component 198, which may be used configured to implement target transceiver module configurations.

Figure 2:
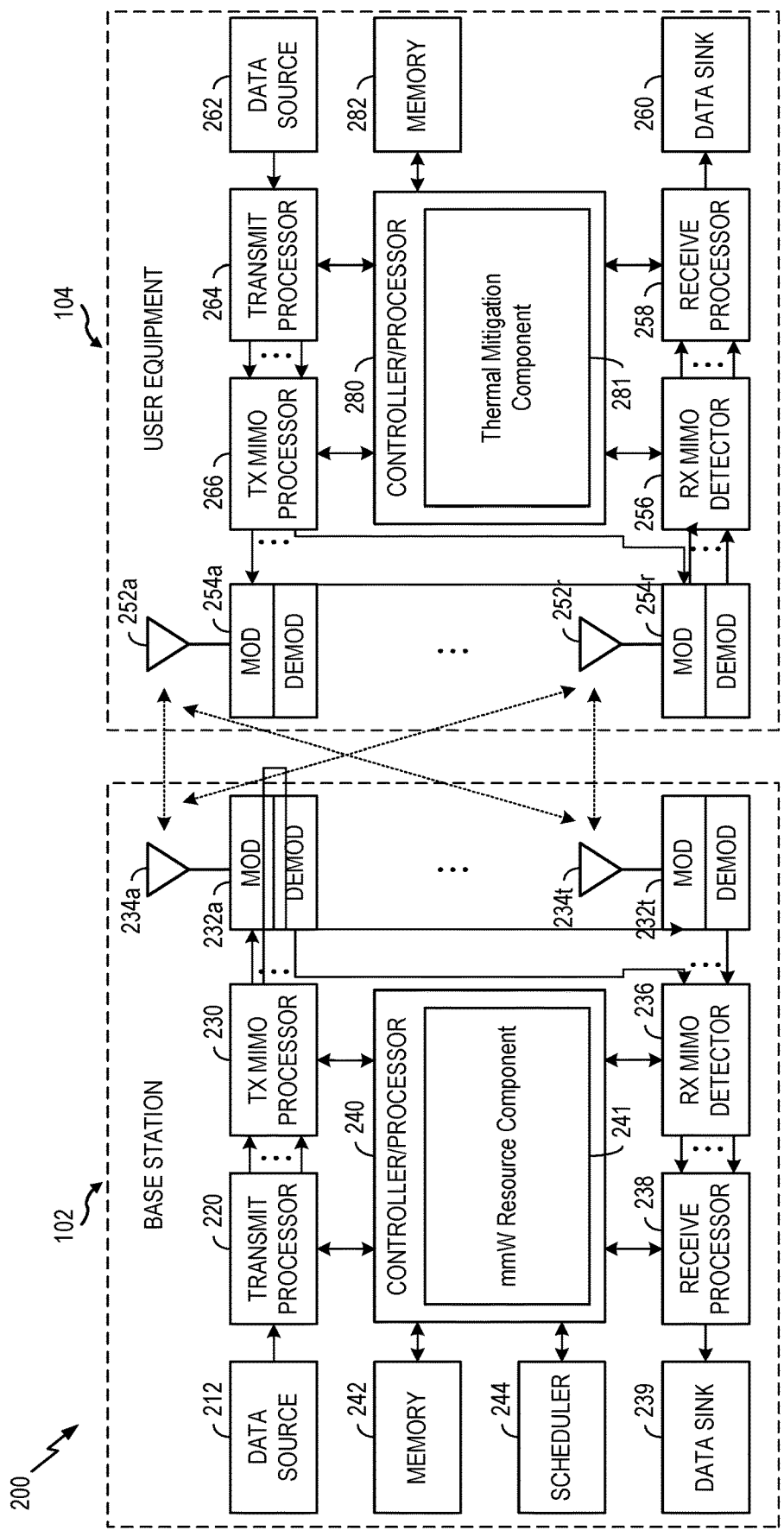
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., source data 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes mmWave resource component 241, which may be representative of mmW resource component 199 of FIG. 1. Notably, while depicted as an aspect of controller/processor 240, mmWave resource component 241 may be implemented additionally or alternatively in various other aspects of base station 102 in other implementations.

Generally, user equipment 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., source data 262) and wireless reception of data (e.g., data sink 260).

User equipment 104 includes controller/processor 280, which may be configured to implement various functions related to wireless communications. In the depicted example, controller/processor 280 includes thermal mitigation component 281, which may be representative of thermal mitigation component 198 of FIG. 1. Notably, while depicted as an aspect of controller/processor 280, thermal mitigation component 281 may be implemented additionally or alternatively in various other aspects of user equipment 104 in other implementations.

Figure 3:
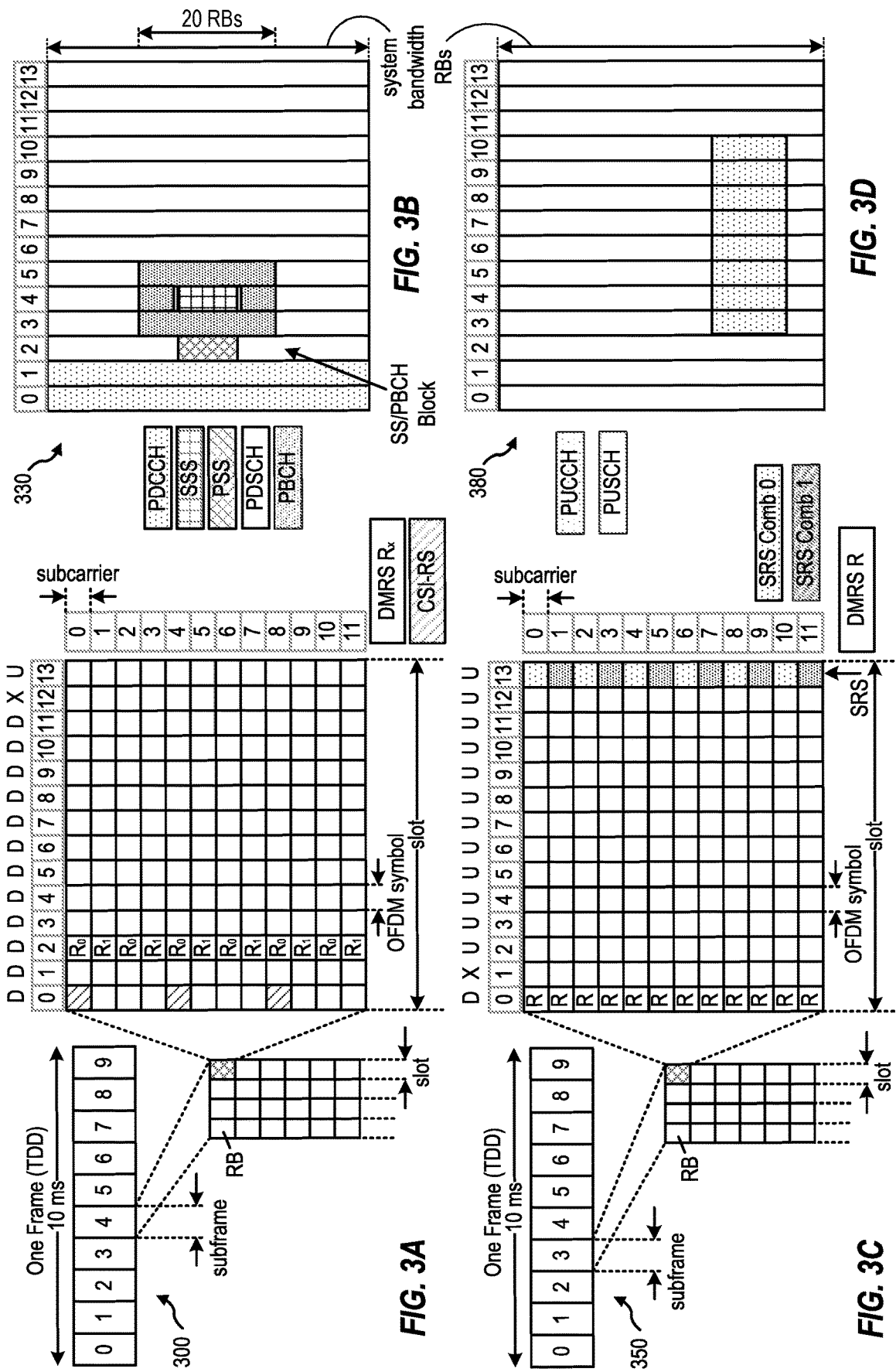
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Aspects Related to Thermal Mitigation in User Equipments Having Multiple Communication Modules Wireless communication devices, such as user equipment described herein, consume electrical energy when performing various signal processing operations, such as receiving communication signals, processing received signals, transmitting communication signals, and the like. This energy consumption creates heat as a byproduct, and that heat needs to be managed by the device for performance and safety reasons. Accordingly, aspects described herein relate to thermal management and mitigation techniques to prevent generation of excessive heat that may result in reduced device performance (e.g., reduced data throughput), device damage, of injury to a user.

In one example, a user equipment may consume power while monitoring bandwidth(s) (e.g., for receiving wireless communications) using a plurality of transceiver (communication) modules. In some cases, such as mmW wireless communications systems, a user equipment may be configured to monitor non-contiguous bandwidth allocations (e.g., lower frequency band(s)+higher frequency band(s)), which may result in the UE performing significant on-going processing, and thus creating significant heat. Further, where different transceiver modules are monitoring different frequency bands, one transceiver may create a higher thermal load (e.g., when monitoring higher frequencies) than another transceiver module (e.g., when monitoring lower frequencies). This may lead to situations where it is desirable to change transceiver modules configurations to mitigate thermal load.

In some aspects, a user equipment may perform thermal mitigation techniques that prioritize certain component carriers within a monitored bandwidth, such a primary component carrier (PCC), over other component carriers, such as a secondary component carrier (SCC), in order to improve 5G network lifecycle, maintain data throughput, and the like. Thus, aspects described herein include intra-module target configurations and inter-module target configurations. Generally, an intra-module target configuration may include or refer to a configuration in which a target transceiver module is configured to monitor both PCC bands and SCC bands. An inter-module target configuration, on the other hand, may include or refer to a configuration in which a plurality of target transceiver modules are configured to monitoring PCC bands and SCC bands separately. In various aspects, the intra-module and inter-module target configurations may be based on one or more temperature thresholds, such as temperature thresholds related to safe operation of user equipment elements (e.g., a transceiver module) as well as temperature thresholds that relate to safe operation by a user, such as a touch temperature threshold. Further, the intra-module and inter-module target configurations may be based on signal characteristics (e.g., signal to interference plus noise SINR)) at individual transceiver modules.

For example, in scenarios where an operating temperature exceeds a temperature threshold, a target transceiver module configurations may be implemented to transition PCC bands, SCC bands, or both, from a PCC-resident transceiver module to another transceiver module with sufficient signal characteristics (e.g., SINR) to reduce the operating temperatures of concern. Beneficially, the performance of transceiver modules monitoring PCC bands may thus be maintained without implementing performance degrading thermal mitigation techniques, such as disabling antenna elements, reducing peak data rates, and terminating 5G connectivity.

Figure 4:
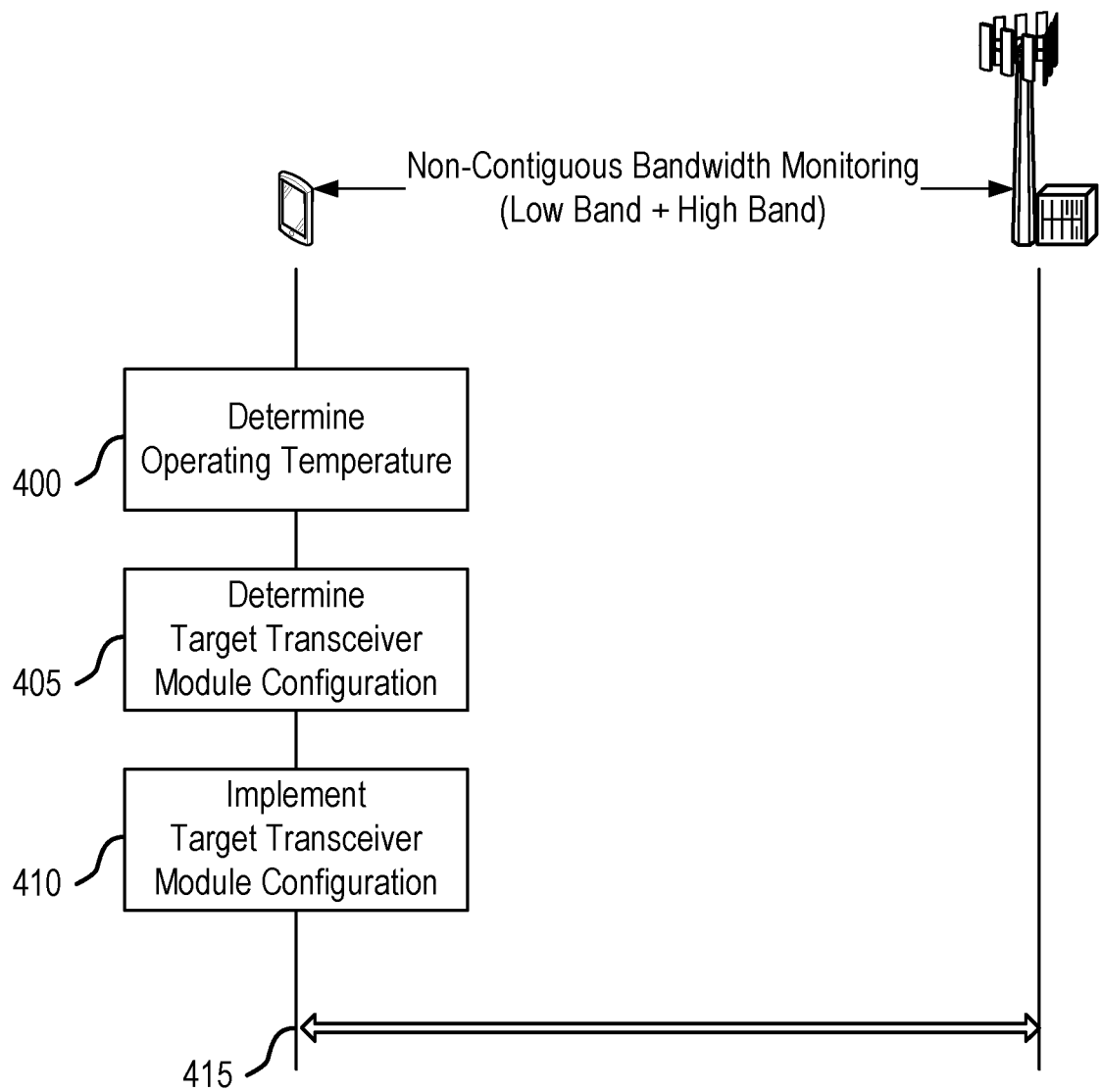
FIG. 4 depicts an example of a process for thermal mitigation.

FIG. 4 depicts an example of a process for thermal mitigation according to aspects of the present disclosure. In some cases, the operations depicted in FIG. 4 refer to, or may be performed by, a UE as described with reference to FIGS. 1, 2, 5, and 10.

At operation 400, the system determines one or more operating temperatures.

Figure 5:
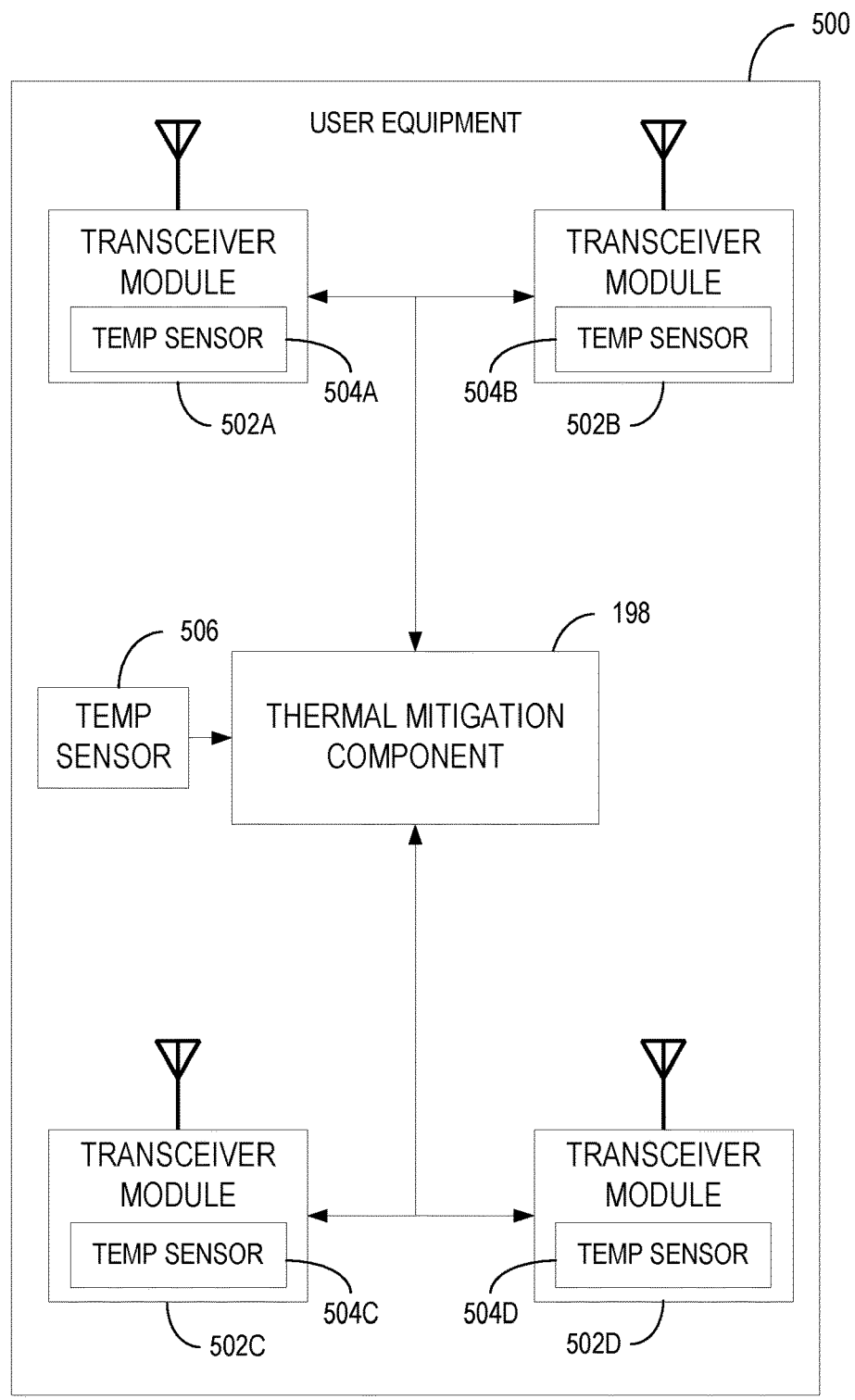
FIG. 5 depicts an example of a user equipment including multiple communication modules and a thermal mitigation component.
Figure 6:
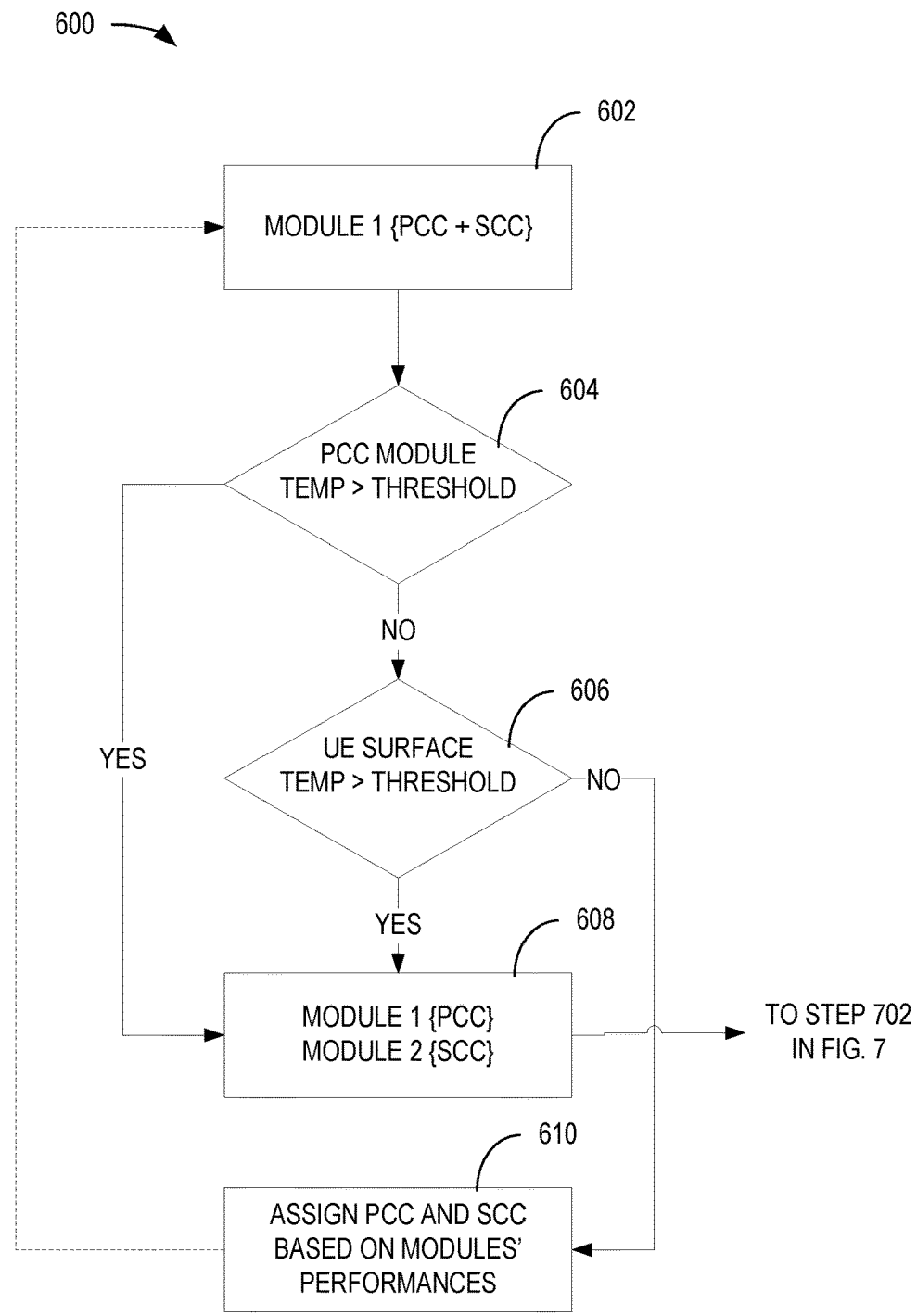
FIG. 6 depicts an example process flow for determining transceiver module configurations based on conditions.
Figure 7:
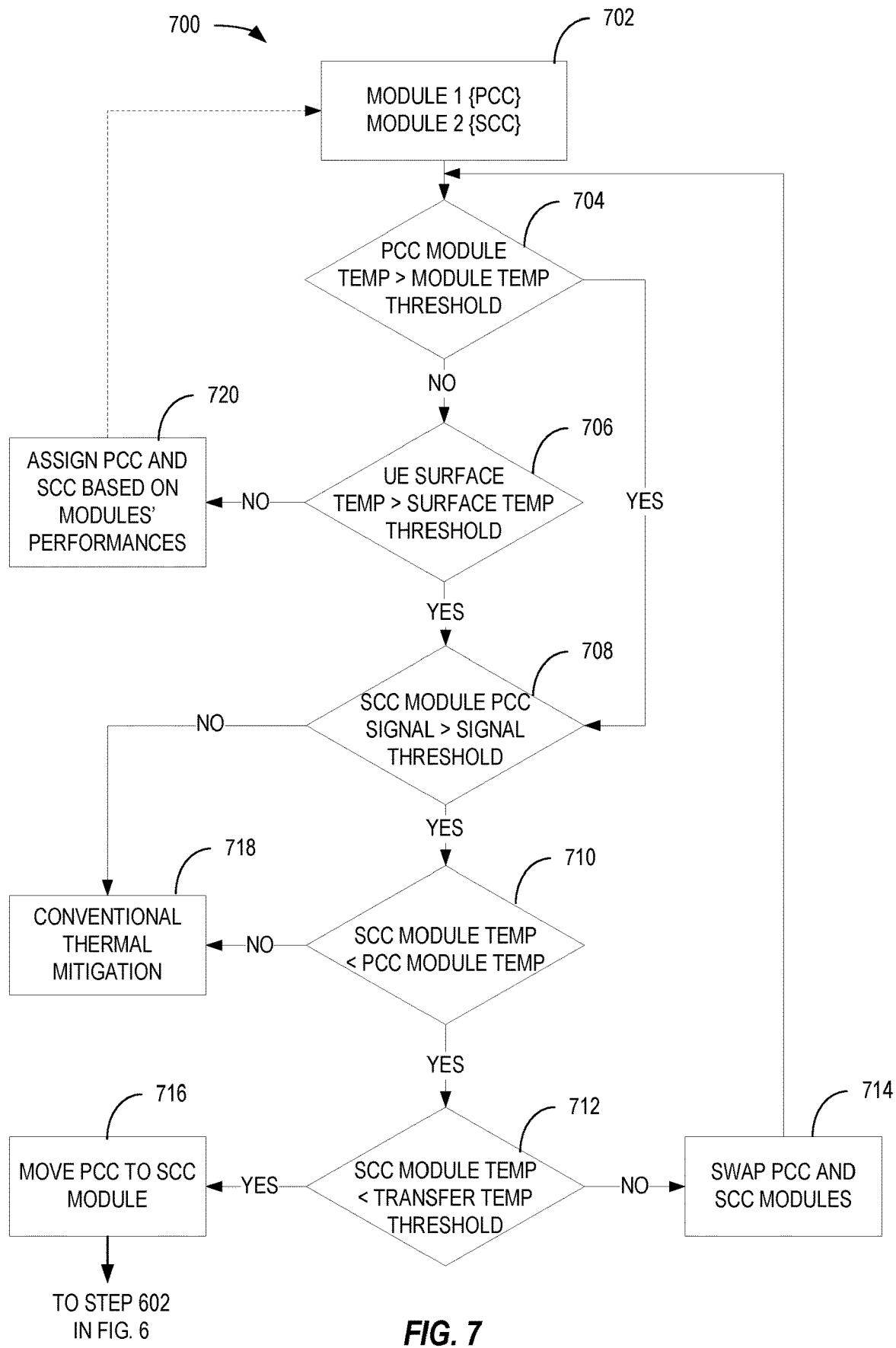
FIG. 7 depicts another example process flow for determining transceiver module configurations based on conditions.

At operation 405, the system determines a target configuration for a set of transceiver modules based on the one or more operating temperatures, such as described in more detail with respect to FIGS. 5-7.

At operation 410, the system implements the target configuration for the set of transceiver modules.

At operation 415, the system performs wireless communications according to the target configuration for the set of transceiver modules. As depicted, the communications may be performed over non-contiguous bands of a wireless spectrum, such as high-frequency and low-frequency bands of a certain frequency range. In some cases, the communications may be performed using mmWave frequencies, as described above.

The techniques described herein address thermal concerns, for example, where a user equipment is configured to perform non-contiguous frequency band monitoring, including contiguous monitoring of FR1 and FR2 component carriers, as well as other carriers. Aspects described herein may implement target configurations (e.g., target bandwidth monitoring configurations) for a plurality of transceiver modules in order to, for example, reduce operation temperature for PCC-resident transceiver modules when operating temperatures are determined to exceed certain thresholds. Embodiments described herein may implement such transceiver module target configurations while maintaining user equipment performance for the PCC so that user equipment connectivity and performance are maintained.

Further details regarding determining and implementing the target configurations are described below, with respect to FIGS. 5-8.

Example User Equipment Configured to Perform Thermal Mitigation

FIG. 5 depicts an example of a user equipment 500 including multiple communication modules and a thermal mitigation component 198, according to aspects of the present disclosure. User equipment 500 may be an example of user equipment 104, described above with respect to FIGS. 1 and 2. Note that selected aspects are depicted in FIG. 5 for clarity, and user equipment 500 may include other aspects as generally described with respect to, for example, FIGS. 1, 2, and 10.

In the depicted example, user equipment 500 includes four transceiver (communication) modules 502A-502D, which in some aspects may comprise mmWave transceiver modules. Note that other examples may include more or fewer transceiver modules, located in different arrangements, and configured to communicate at different frequencies.

In some cases, a user equipment may generally include transceiver modules that are spaced apart in order that conditions adversely affecting one transceiver module may not affect another transceiver module, or at least not as significantly, and further to reduce the thermal load on any one part of user equipment 500. For example, if user equipment 500 were being grasped by a user by a bottom portion, the user's hand may attenuate signals transmitted from and received by transceiver modules 502C and 502D at the bottom of user equipment 500, but not transceiver modules 502A and 502B at the top of user equipment 500. As such, user equipment 500 may generally measure signal characteristics at each transceiver module (e.g., 502A-502D) and select a subset of transceiver modules to perform wireless communications, including monitoring of various bandwidths for performance conditions, based on the modules having the best signal characteristics.

Transceiver modules 502A-502D includes temperature sensors 504A-D, respectively, which may be configured to measure module and/or juncture temperatures associated with the modules. User equipment 500 further includes temperature sensor 506, which may be configured to measure a case temperature, screen temperature, or other physical interface of user equipment 500 that is likely to come into contact with a user's skin, and thus may be referred to as a "touch" temperature. Note that the number of and various locations of the temperature sensors in FIG. 5 are merely demonstrative, and many other configurations are possible.

As described above, for both performance and safety reasons, managing the thermal load of user equipment 500 is beneficial, and thus thermal mitigation component 198 may be configured to monitor temperatures of various aspects of user equipment 500 (e.g., temperature sensors 504A-504D and 506) and configure target transceiver module configurations.

For example, a first transceiver module 502A may initially be configured to monitor PCC bands and SCC bands (e.g., and first transceiver module 502A may thus be referred to as a PCC-resident transceiver module) in an intra-module configuration. In cases where an operating temperature of first transceiver module 502A exceeds a temperature threshold, a target configuration (different from the current configuration) may be implemented where non-PCC bands (e.g., SCC bands) are moved to a second transceiver module, such as second transceiver module 502B. In some cases, this move may be based on second transceiver module 502B having the best signal characteristics for the SCC bands out of the available, alternative transceiver modules, including 502B-502D. Such a transition from an intra-module configuration (e.g., where first transceiver module 502A monitors both PCC bands and SCC bands) to an inter-module configuration (e.g., where first transceiver module 502A monitors PCC bands and second transceiver module 502B monitors SCC bands) may reduce operating temperatures at first transceiver module 502A, which may improve the performance of first transceiver module 502A, reduce the chance of damage to first transceiver module 502A, and reduce the chance of user injury due to high temperatures.

As another example, first transceiver module 502A may initially be configured to monitor PCC bands (e.g., the PCC-resident transceiver module) and second transceiver module 502B may initially be configured to monitor SCC bands; thus, user equipment 500 may initially be in an inter-module configuration. In cases where an operating temperature of first transceiver module 502A exceeds a temperature threshold, a target configuration may be implemented where the PCC bands are moved to second transceiver module 502B. In some cases, this move may be based on second transceiver module 502B having the best signal characteristics for the PCC bands out of the available, alternative transceiver modules, including 502B-502D. Such a transition from an inter-module configuration to an intra-module configuration (e.g., where second transceiver module 502B monitors both PCC bands and SCC bands) may have the same performance and safety benefits described above.

In another example, where first transceiver module 502A is initially configured to monitor PCC bands, but exceeds a temperature threshold, a target configuration may include an inter-module configuration where the PCC bands handled by the first transceiver module 502A are swapped with the SCC bands monitored by the second transceiver module 502B. In some cases, this may be based on the second transceiver module 502B having the best signal characteristics of the remaining transceiver modules. Such inter-module configuration swapping between the first transceiver module 502A and the second transceiver module 502B. may have the same performance and safety benefits described above.

In some aspects, target configurations of the plurality of transceiver modules of user equipment 500 may be implemented as an alternative to, or in addition to, other thermal mitigation techniques (e.g., such as disabling of one or more antenna elements of any of the transceiver modules 502A-502D) based on operating temperatures.

In some aspects, user equipment 500 hardware (e.g., any of the transceiver modules 502A-502D) may be configured with a module or junction temperature ($T_j$) threshold of 95 degrees Celsius to avoid damage to the hardware or to user equipment 500 more generally. In some aspects, user equipment 500 may be configured with a touch temperature ($T_{touch}$) threshold of 43 degrees Celsius, which may relate to any surface of user equipment 500 likely to come into contact with a user's skin. Generally, thermal thresholds (e.g., junction temperature ($T_j$) thermal thresholds and/or touch temperature ($T_{touch}$) thermal thresholds) may depend on a specific implementation of user equipment 500, and may be defined by an original equipment manufacturer (OEM), and the like.

In one example, thermal mitigation component 198 of FIG. 1 is configured to monitor temperature data, such as from temperature sensors 504A-504D and 506, and to implement various inter-module and intra-module configurations, such as described with FIGS. 6 and 7.

Example Thermal Mitigation State Flows

FIG. 6 depicts an example process flow 600 (or algorithm) for determining transceiver (communication) module configurations in a user equipment including a plurality of transceiver modules, such as the example user equipment 500 described above with respect to FIG. 5. Flow 600 may be referred to as an intra-module thermal monitoring mode because the initial state has the user equipment monitoring PCC and SCC bandwidths with a single transceiver module.

Flow 600 beings at step 602 where a first transceiver module (module 1) in the user equipment (e.g., 104 in FIGS. 1 and 2) is currently configured to monitor PCC and SCC bandwidths in an intra-module configuration. In this case, the first transceiver module is considered the PCC-resident transceiver module.

Flow 600 then proceed to step 604 where the user equipment determines whether the first transceiver module is exceeding a temperature threshold, such as a junction temperature ($T_j$) threshold of 95 degrees Celsius.

If the first transceiver module is exceeding the temperature threshold, then the user equipment determines and implements a target configuration. For example, here flow 600 proceeds to step 608 where the SCC bandwidths are moved to a second transceiver module (module 2) in order to reduce the burden on the first transceiver module and to lower the temperature. The second module may be selected by the user equipment based on, for example, having the best signal characteristics for the SCC bandwidths at the time. Once implemented, the user equipment may be considered to be in an inter-module transceiver configuration, and the flow may proceed to step 702 of FIG. 7.

If the first transceiver module is not exceeding the temperature threshold, then flow proceeds to step 606 where the user equipment determines whether a surface temperature threshold (e.g., a touch temperature ($T_{touch}$) threshold of 43 degrees Celsius) is being exceeded. For example, a temperature sensor such as 506 in FIG. 5 may be configured to measure the temperatures of various "touchable" (by a user) surfaces of the user equipment.

If at step 606 the surface temperature is exceeding the surface temperature threshold, then the user equipment determines and implements a target transceiver module configuration. For example, here flow 600 proceeds to step 608 where the SCC bandwidths are moved to a second transceiver module (module 2) in order to distribute the load and the heat generated. For example, if the surface temperature sensor is near module 1, moving some of the load from module 1 to module 2 may reduce the temperatures of structures adjacent to module 1, such as a touchable surface. As above, because the user equipment is now in an inter-module transceiver configuration, the flow may proceed to step 702 of FIG. 7.

If at step 606 the surface temperature is not exceeding the surface temperature threshold, then flow 600 proceeds to step 610 where the user equipment makes a new determination of how to assign the PCC and SCC bandwidths to its various transceiver modules based on, for example, signal quality characteristics at each module. In some cases, the user equipment may maintain its current configuration based on the signal characteristics, or otherwise maintain an intra-module configuration, in which case flow 600 returns to step 602.

In some cases, whether flow 600 proceeds to step 610 or alternatively returns to step 602 from step 606 may depend on a periodicity, dwell, or interval associated with the current configuration. For example, a timer may be reset every time a configuration changes and new module signal performance measurements may be made every time the timer expires. Thus, if at step 606 the surface temperature is not exceeding the temperature threshold, and a timer for the current configuration is not yet expired, then flow 600 may return to step 602.

FIG. 6 is just one example of a thermal monitoring and mitigation flow, and others are possible in which various steps may be added, omitted, or altered in their order.

FIG. 7 depicts another example process flow 700 (or algorithm) for determining transceiver (communication) module configurations in a user equipment including a plurality of transceiver modules, such as the example user equipment 500 described above with respect to FIG. 5. Flow 700 may be referred to as an inter-module thermal monitoring mode because the initial state has the user equipment monitoring PCC and SCC bandwidths using different transceiver modules.

Flow 700 beings at step 702 where a first transceiver module (module 1) in the user equipment is currently configured to monitor PCC bandwidths and a second transceiver module (module 2) is currently configured to monitor SCC bandwidths in an inter-module configuration.

Flow 700 then proceeds to step 704 where the user equipment determines if the PCC-resident module is exceeding a temperature threshold, such as a junction temperature ($T_j$) threshold of 95 degrees Celsius.

If at step 704 the PCC-resident transceiver module is not exceeding the temperature threshold, the flow 700 proceeds to step 706 where the user equipment determines if the a surface temperature is exceeding a temperature threshold, such as a touch temperature ($T_{touch}$) threshold of 43 degrees Celsius.

If at step 706 the surface temperature is not exceeding the temperature threshold, then flow 700 proceeds to step 720 where the user equipment once again assigns the PCC and SCC bandwidths to transceiver modules based on, for example, signal characteristics at each module.

In some cases, flow 700 returns to step 702 with the same configuration. In some cases, whether flow 700 proceeds to step 720 or returns to step 702 may depend on a periodicity or dwell associated with the current configuration. For example, a timer may be reset every time a configuration changes and new module signal performance measurements may be made when the time expires. Thus, if at step 706 the surface temperature is not exceeding the temperature threshold, and a timer for the current configuration is not yet expired, then flow 700 may return to step 702.

If at step 704 the PCC-resident transceiver module is exceeding the temperature threshold, or if at step 706 the surface temperature is exceeding the temperature threshold, then flow 700 proceeds to step 708 where the user equipment determines if the SCC-resident transceiver module (module 2) has a signal characteristic (e.g., a signal to interference plus noise (SINR)) for the PCC bandwidths that exceeds a signal characteristic threshold.

If at step 708, the user equipment determines that the SCC-resident transceiver module (module 2) has a signal characteristic that does not exceeds the signal characteristic threshold (e.g., is worse than the threshold), then flow 700 proceeds to step 718 and performs conventional thermal mitigation, such as disabling antenna elements in the PCC-resident transceiver module (module 1) and/or reducing communication duty cycle (e.g., reducing PUSCH duty cycle). In this case, conventional thermal mitigation techniques are used because swapping the modules will not work due to the signal characteristics of the SCC-resident module (module 2) and the current temperature of either the PCC-resident transceiver module (module 1) or a surface of the user equipment require reduction of the thermal load.

If at step 708, the user equipment determines that the SCC-resident transceiver module (module 2) has a signal characteristic that exceeds the signal characteristic threshold, the flow 700 proceeds to step 710 where the user equipment determines if the SCC-resident transceiver module (module 2) temperature is less than the PCC-resident transceiver module (module 1) temperature.

If at step 710, the user equipment determines that the SCC-resident transceiver module (module 2) temperature is greater than the PCC-resident transceiver module (module 1) temperature, then flow 700 proceeds to step 718 where the user equipment performs conventional thermal mitigation, as described above. Here, even though the PCC signal characteristics at the second transceiver module would otherwise allow movement of the PCC bandwidths to the SCC-resident transceiver module (module 2), the temperature of the SCC-resident transceiver module does not allow for the move or swap of the bandwidths.

If at step 710, the user equipment determines that the SCC-resident transceiver module (module 2) temperature is less than the PCC-resident transceiver module (module 1) temperature, then flow 700 proceeds to step 712 where the user equipment determines whether the SCC-resident transceiver module (module 2) has a temperature below a transfer temperature threshold ($T_{transfer}$) The transfer temperature threshold may act as a threshold to determine whether the SCC-resident transceiver module (module 2) has sufficient thermal headroom to take on the PCC bandwidths, even if its temperature is lower than, for example, a junction temperature threshold.

If at step 712 the user equipment determines that the SCC-resident transceiver module (module 2) has a temperature below a transfer temperature threshold, then flow 700 proceeds to step 716 where the user equipment transfers the PCC bandwidths from module 1 to the SCC-resident transceiver module (module 2). At this point, the user equipment is now in an intra-module thermal monitoring mode, and may thus return to step 602 of FIG. 6.

If at step 712 the user equipment determines that the SCC-resident transceiver module (module 2) has a temperature below a transfer temperature threshold, then flow 700 proceeds to step 714 where the user equipment swaps the PCC bands and SCC bands between modules 1 and 2, such that the PCC-resident transceiver module becomes the SCC-resident transceiver module and the SCC-resident transceiver module becomes the PCC-resident transceiver module. From step 714, flow 700 returns to step 704. Alternatively, flow 700 could return to step 720 based on a timer or interval for the current transceiver module configuration.

FIG. 7 is just one example of a thermal monitoring and mitigation flow, and others are possible in which various steps may be added, omitted, or altered in their order.

Example Methods

Figure 8:
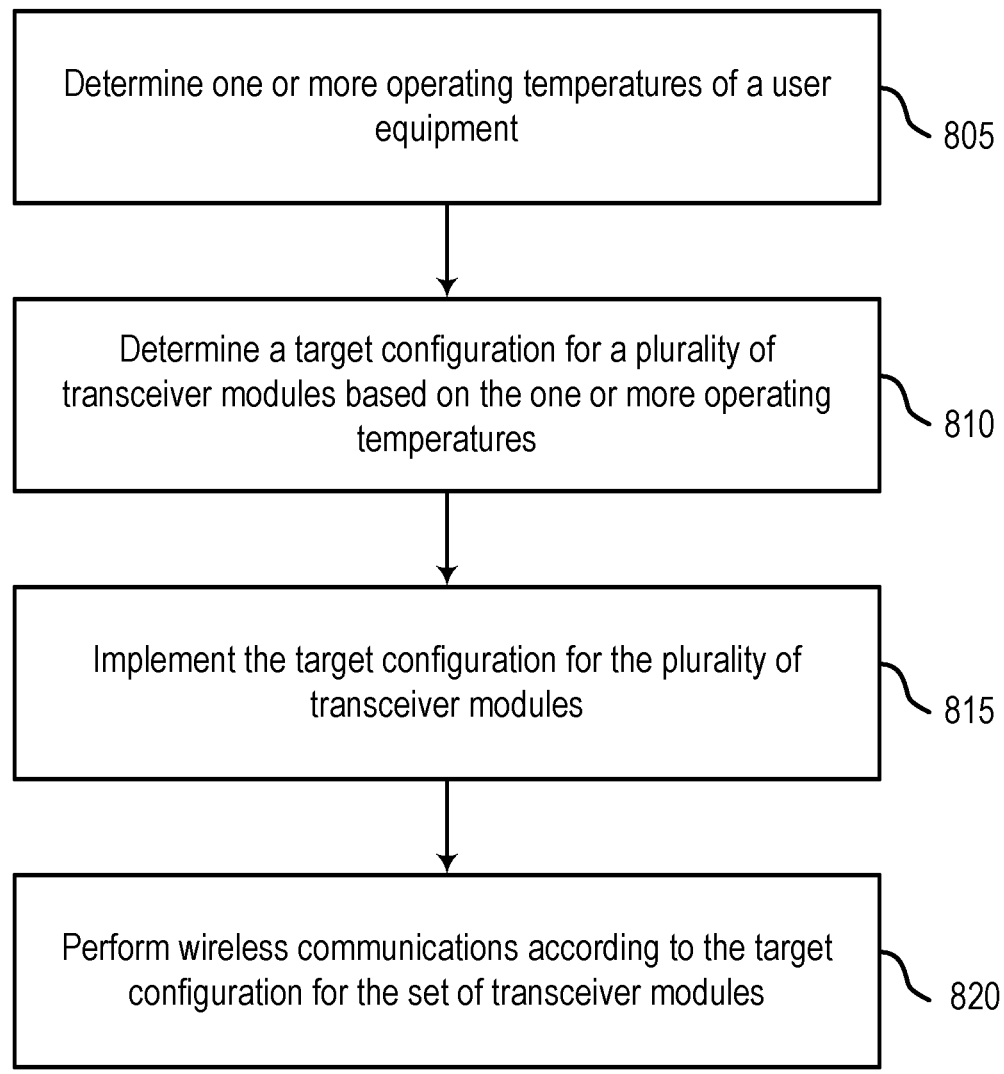
FIG. 8 depicts an example method for thermal mitigation in a user equipment having multiple communication modules.

FIG. 8 shows an example of a method 800 for thermal mitigation of a user equipment having multiple transceiver (communication) modules, according to aspects of the present disclosure. In some aspects, a user equipment, such as user equipment 104 of FIGS. 1 and 2, user equipment 500 of FIG. 5, or processing system 1000 of FIG. 10, may be configured to perform the method 800.

At step 805, the system determines one or more operating temperatures of a user equipment. In some cases, the operations of this step refer to, or may be performed by, an operating temperature circuitry as described with reference to FIG. 10.

At step 810, the system determines a target configuration for a plurality of transceiver modules based on the one or more operating temperatures. In some cases, the operations of this step refer to, or may be performed by, a transceiver module configuration circuitry as described with reference to FIG. 10.

In some aspects, the plurality of transceiver modules comprises a plurality of millimeter wave transceiver modules.

At operation 815, the system implements the target configuration for the plurality of transceiver modules. In some cases, the operations of this step refer to, or may be performed by, a transceiver module configuration circuitry as described with reference to FIG. 10.

At operation 820, the system performs wireless communications according to the target configuration for the plurality of transceiver modules. In some cases, the operations of this step refer to, or may be performed by, a transceiver module circuitry as described with reference to FIG. 10.

In some aspects, method 800 further includes determining one or more updated operating temperatures of the user equipment; and implementing a previous configuration for the plurality of transceiver modules based on the one or more updated operating temperatures.

In some aspects, the one or more operating temperatures of the user equipment comprise at least a transceiver junction temperature and a touch temperature of the user equipment; and the determining the target configuration for the plurality of transceiver modules based on the one or more operating temperatures comprises at least one of determining that a temperature of a transceiver module of the plurality of transceiver modules configured to perform the wireless communications using a primary component carrier exceeds a transceiver module temperature threshold or determining that a case temperature of the user equipment exceeds a case temperature threshold.

In some aspects, a current configuration for the plurality of transceiver modules configures a single transceiver module of the plurality of transceiver modules to perform the wireless communications using a first subset of bandwidths and a second subset of bandwidths; and the target configuration for the plurality of transceiver modules configures a first transceiver module of the plurality of transceiver modules to perform the wireless communications on the primary component carrier using the first subset of bandwidths and a second transceiver module of the plurality of transceiver modules to perform the wireless communications on a secondary component carrier using the second subset of bandwidths.

In some aspects, the first subset of bandwidths comprises relatively higher bandwidth component carriers and the second subset of bandwidths comprises relatively lower bandwidth component carriers.

In some aspects, the signal quality metric comprises a signal to noise ratio (SNR) or a signal to interference plus noise ratio (SINR).

In some aspects, method 800 further includes determining a transceiver module of the first transceiver module and the second transceiver module in the target configuration that has a highest signal quality metric; determining which subset of the first subset of bandwidths and the second subset of bandwidths includes a primary component carrier; and assigning the determined subset to the determined transceiver module having the highest signal quality metric.

In some aspects, the single transceiver module in the current configuration has a highest signal quality metric of the plurality of transceiver modules.

In some aspects, a current configuration for the plurality of transceiver modules configures a first transceiver module of the plurality of transceiver modules to perform the wireless communications using a first subset of bandwidths and a second transceiver module of the plurality of transceiver modules to perform the wireless communications using a second subset of bandwidths; the first subset of bandwidths includes the primary component carrier; and the target configuration for the plurality of transceiver modules configures one of the second transceiver module to perform the wireless communications using the first subset of bandwidths and the second subset of bandwidths; the first transceiver module to perform the wireless communications using the second subset of bandwidths and the second transceiver module to perform the wireless communications using the first subset of bandwidths; or at least one of the first transceiver module or the second transceiver module to perform thermal mitigation.

In some aspects, method 800 further includes: determining that a signal quality metric of the primary component carrier for the second transceiver module exceeds a signal quality threshold; determining that a temperature of the second transceiver module is below a temperature of the first transceiver module; determining that the temperature of the second transceiver module is below the transceiver module temperature threshold; performing the wireless communication with second transceiver module using the first subset of bandwidths and the second subset of bandwidths, wherein the target configuration for the plurality of transceiver modules configures the second transceiver module to perform the wireless communications using the first subset of bandwidths and the second subset of bandwidths.

In some aspects, method 800 further includes: determining that a signal quality metric of the primary component carrier for the second transceiver module exceeds a signal quality threshold; determining that a temperature of the second transceiver module is below a temperature of the first transceiver module; determining that the temperature of the second transceiver module is above the transceiver module temperature threshold; and performing the wireless communication with second transceiver module using the second subset of bandwidths, wherein the target configuration for the plurality of transceiver modules configures the first transceiver module to perform the wireless communications using the second subset of bandwidths and the second transceiver module to perform the wireless communications using the first subset of bandwidths.

In some aspects, method 800 further includes: determining that a signal quality metric of the primary component carrier for the second transceiver module is below a signal quality threshold or that a temperature of the second transceiver module exceeds a temperature of the first transceiver module, wherein the target configuration for the plurality of transceiver modules configures the first transceiver module to perform thermal mitigation.

In some aspects, method 800 further includes performing thermal mitigation at the first transceiver module by disabling one or more antenna elements of the first transceiver module or reducing a duty cycle of communications.

Example Wireless Communication Devices

Figure 9:
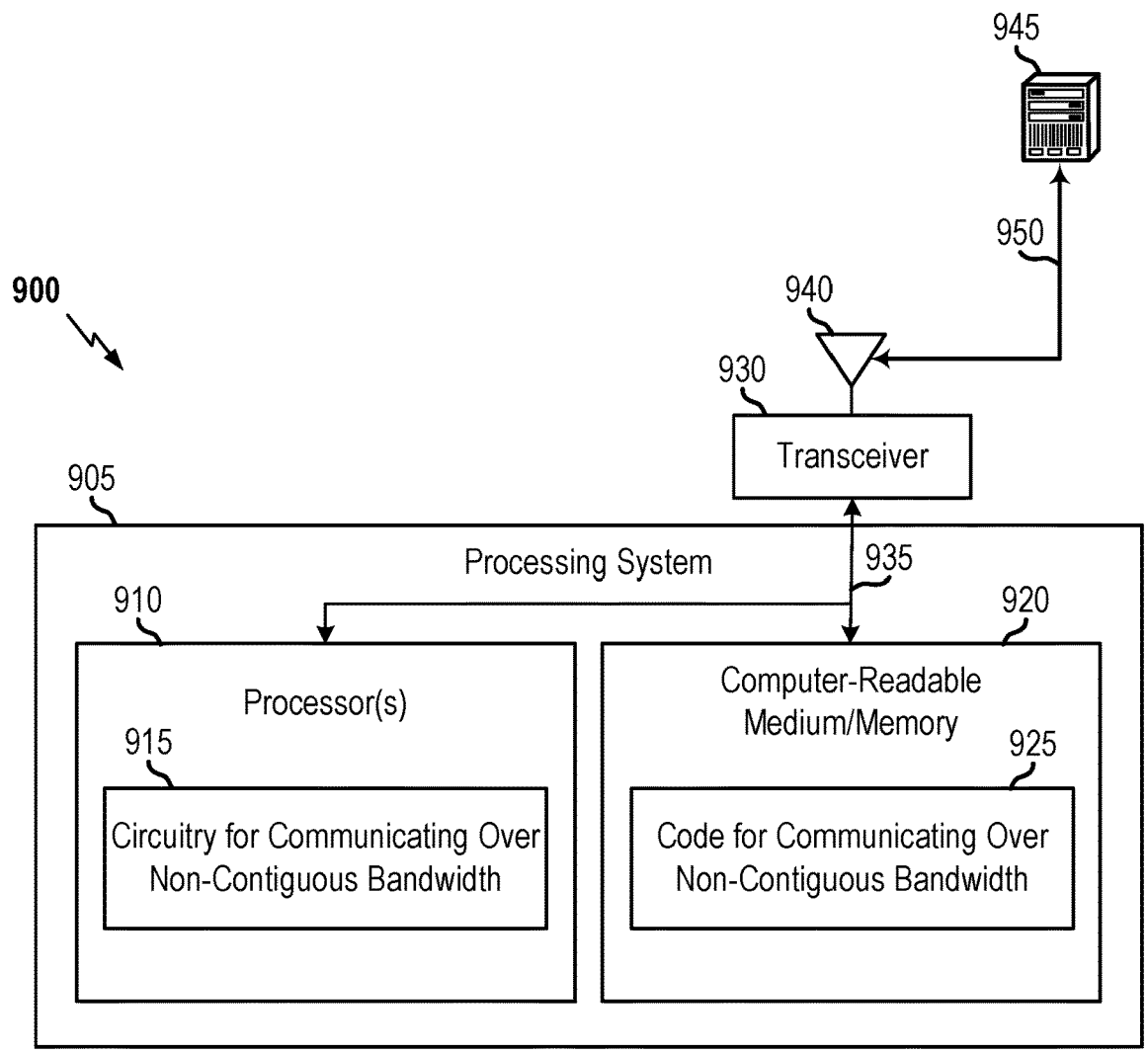
FIGS. 9 and 10 depict example communications devices.

FIG. 9 depicts an example communications device 900 that includes various components operable, configured, or adapted to perform operations for the techniques disclosed herein, such as the operations depicted and described with respect to FIGS. 1 and 2. In some examples, communication device 900 may be a base station as described, for example with respect to FIGS. 1 and 2.

Communications device 900 includes a processing system 905 coupled to a transceiver 930 (e.g., a transmitter and/or a receiver). Transceiver 930 is configured to transmit (or send) and receive signals for the communications device 900 via an antenna 940, such as the various signals as described herein. Processing system 905 may be configured to perform processing functions for communications device 900, including processing signals received and/or to be transmitted by communications device 900.

Processing system 905 includes one or more processors 910 coupled to a computer-readable medium/memory 920 via a bus 935. In certain aspects, computer-readable medium/memory 920 is configured to store instructions (e.g., computer-executable code) that when executed by the one or more processors 910, cause the one or more processors 910 to perform the operations illustrated in FIGS. 1 and 2, or other operations for performing the various techniques discussed herein for communicate with user equipment over non-contiguous bandwidth allocations.

In the depicted example, computer-readable medium/memory 920 stores code 925 for communicating over non-contiguous bandwidth. In the depicted example, the one or more processors 910 include circuitry configured to implement the code stored in the computer-readable medium/memory 920, including circuitry 915 for communicating over non-contiguous bandwidth.

Various components of communications device 900 may provide means for performing the methods described herein, including with respect to FIGS. 1 and 2. In some examples, means for transmitting or sending (or means for outputting for transmission) may include the transceivers 232 and/or antenna(s) 234 of the base station 102 illustrated in FIG. 2 and/or transceiver 930 and antenna 940 of the communication device 900 in FIG. 9. In some examples, means for receiving (or means for obtaining) may include the transceivers 232 and/or antenna(s) 234 of the base station illustrated in FIG. 2 and/or transceiver 908 and antenna 910 of the communication device 900 in FIG. 9.

In some examples, means for communicating over non-contiguous bandwidth may include various processing system components, such as: the one or more processors 910 in FIG. 9, or aspects of the base station 102 depicted in FIG. 2, including receive processor 238, transmit processor 220, TX MIMO processor 230, and/or controller/processor 240 (including mmWave resource component 241).

Base stations 900 may communicate with core network 945, as well as with other base stations. In some examples, core network 945 interfaces with base station 900 through backhaul links 950 (e.g., via an interface, such as an S1 interface). Base stations 900 may also communicate with one another (e.g., over backhaul links, for example, such as an X2 interface or another interface) either indirectly (e.g., via core network 945) or directly (e.g., directly between base stations 900). The core network 945 may provide access authorization, user authentication, tracking, Internet Protocol (IP) connectivity, and other access, routing, or mobility functions.

Notably, FIG. 9 is just one example, and many other examples and configurations of communication device 900 are possible.

Figure 10:
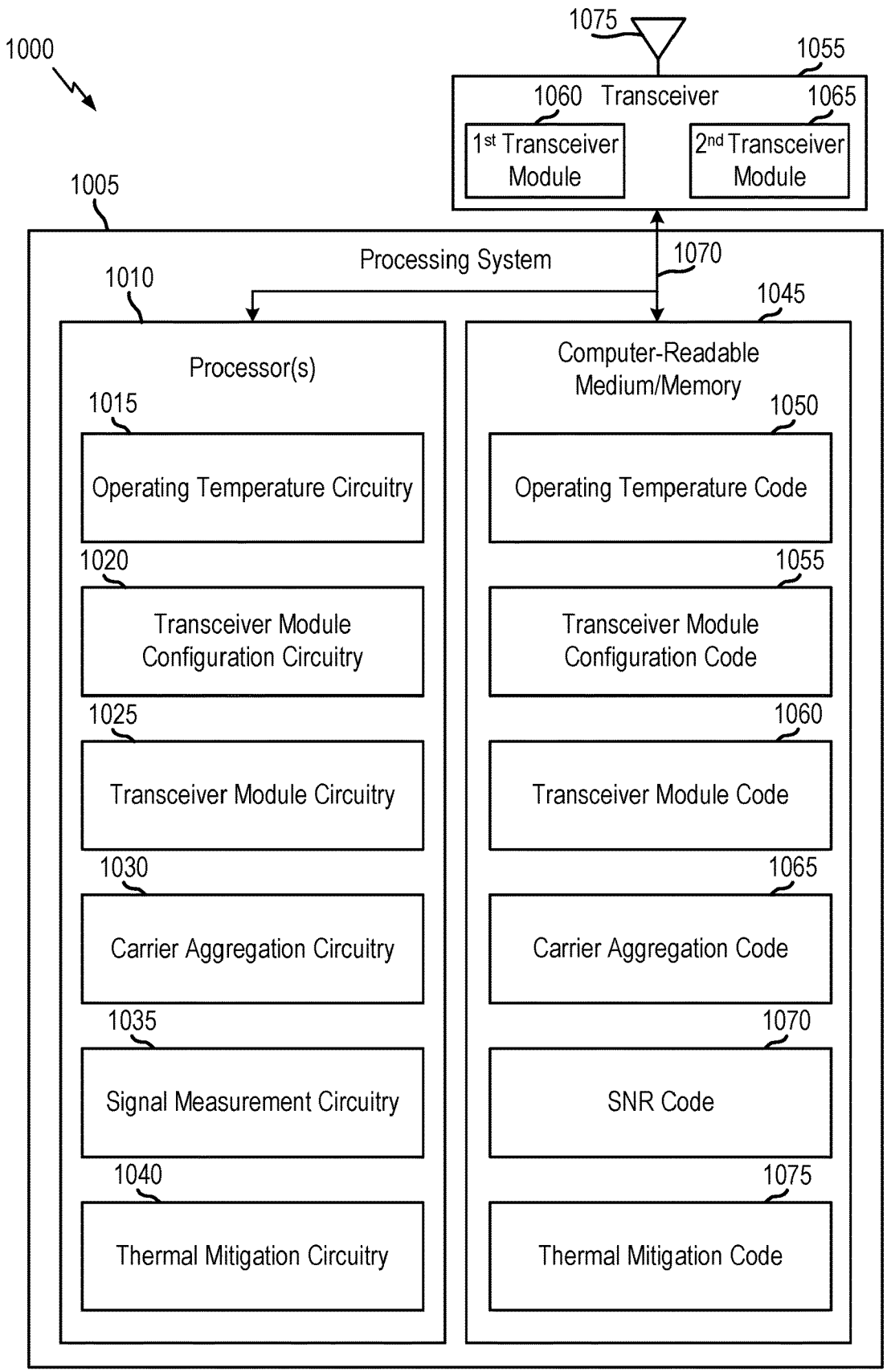

FIG. 10 depicts an example communications device 1000 that includes various components operable, configured, or adapted to perform operations for the techniques disclosed herein, such as the operations depicted and described with respect to FIGS. 4-8. In some examples, communication device 1000 may be a user equipment as described, for example with respect to FIGS. 1, 2, and 5.

Communications device 1000 includes a processing system 1005 coupled to a transceiver 1055 (e.g., a transmitter and/or a receiver). Transceiver 1055 is configured to transmit (or send) and receive signals for the communications device 1000 via an antenna 1075, such as the various signals as described herein. Processing system 1005 may be configured to perform processing functions for communications device 1000, including processing signals received and/or to be transmitted by communications device 1000. In the depicted example, transceiver 1055 includes first transceiver module 1060 and second transceiver module 1065, which may correspond to, for example, transceiver modules as described with respect to FIG. 5. For example, transceiver modules 1060 and 1065 may be mmWave transceiver modules.

Processing system 1005 includes one or more processors 1010 coupled to a computer-readable medium/memory 1045 via a bus 1070. In certain aspects, computer-readable medium/memory 1045 is configured to store instructions (e.g., computer-executable code) that when executed by the one or more processors 1010, cause the one or more processors 1010 to perform the operations illustrated in FIGS. 4-8, or other operations for performing the various techniques discussed herein for implementing target transceiver module configurations.

In the depicted example, computer-readable medium/memory 1045 stores operating temperature code 1015, transceiver module configuration code 1020, transceiver module code 1025, carrier aggregation code 1030, SNR code 1035, and thermal mitigation code 1040.

In the depicted example, the one or more processors 1010 include circuitry configured to implement the code stored in the computer-readable medium/memory 1045, including operating temperature circuitry 1015, transceiver module configuration circuitry 1020, transceiver module circuitry 1025, carrier aggregation circuitry 1030, SNR circuitry 1035, and thermal mitigation circuitry 1040.

According to some aspects, operating temperature circuitry 1015 determines one or more operating temperatures of a user equipment. In some examples, operating temperature circuitry 1015 determines one or more updated operating temperatures of the user equipment. In some examples, the one or more operating temperatures of the user equipment include at least a transceiver module temperature and a case temperature of the user equipment. In some examples, operating temperature circuitry 1015 determines that a temperature of the second transceiver module 1065 is below a temperature of the first transceiver module 1060. In some examples, operating temperature circuitry 1015 determines that the temperature of the second transceiver module 1065 is below the transceiver module temperature threshold. In some examples, operating temperature circuitry 1015 determines that a temperature of the second transceiver module 1065 is below a temperature of the first transceiver module 1060. More generally, operating temperature circuitry 1015 may be configured to perform various functions as described above with respect to FIGS. 4-8.

According to some aspects, transceiver module configuration circuitry 1020 determines a target configuration for a set of transceiver modules based on the one or more operating temperatures. In some examples, transceiver module configuration circuitry 1020 implements the target configuration for the set of transceiver modules. In some examples, the set of transceiver modules includes a set of millimeter wave transceiver modules. In some examples, transceiver module configuration circuitry 1020 implements a previous configuration for the set of transceiver modules based on the one or more updated operating temperatures. In some examples, the determining the target configuration for the set of transceiver modules based on the one or more operating temperatures includes at least one of determining that a temperature of a transceiver module of the set of transceiver modules configured to perform the wireless communications using a primary component carrier exceeds a transceiver module temperature threshold or determining that a case temperature of the user equipment exceeds a case temperature threshold. More generally, transceiver module configuration circuitry 1020 may be configured to perform various functions as described above with respect to FIGS. 4-8.

In some examples, a current configuration for the set of transceiver modules configures a single transceiver module of the set of transceiver modules to perform the wireless communications using a first subset of bandwidths and a second subset of bandwidths. In some examples, the target configuration for the set of transceiver modules configures a first transceiver module 1060 of the set of transceiver modules to perform the wireless communications on the primary component carrier using the first subset of bandwidths and a second transceiver module 1065 of the set of transceiver modules to perform the wireless communications on a secondary component carrier using the second subset of bandwidths. In some examples, the first subset of bandwidths includes relatively higher bandwidth component carriers and the second subset of bandwidths includes relatively lower bandwidth component carriers.

In some examples, a current configuration for the set of transceiver modules configures a first transceiver module 1060 of the set of transceiver modules to perform the wireless communications using a first subset of bandwidths and a second transceiver module 1065 of the set of transceiver modules to perform the wireless communications using a second subset of bandwidths. In some examples, the first subset of bandwidths includes the primary component carrier. In some examples, the target configuration for the set of transceiver modules configures one of the second transceiver module 1065 to perform the wireless communications using the first subset of bandwidths and the second subset of bandwidths; the first transceiver module 1060 to perform the wireless communications using the second subset of bandwidths and the second transceiver module 1065 to perform the wireless communications using the first subset of bandwidths; or at least one of the first transceiver module 1060 or the second transceiver module 1065 to perform thermal mitigation.

According to some aspects, transceiver module circuitry 1025 performs wireless communications according to the target configuration for the set of transceiver modules. In some examples, transceiver module circuitry 1025 performs the wireless communication with second transceiver module 1065 using the first subset of bandwidths and the second subset of bandwidths. In some examples, the target configuration for the set of transceiver modules configures the second transceiver module 1065 to perform the wireless communications using the first subset of bandwidths and the second subset of bandwidths. In some examples, transceiver module circuitry 1025 performs the wireless communication with second transceiver module 1065 using the second subset of bandwidths. In some examples, the target configuration for the set of transceiver modules configures the first transceiver module 1060 to perform the wireless communications using the second subset of bandwidths and the second transceiver module 1065 to perform the wireless communications using the first subset of bandwidths. More generally, transceiver module circuitry 1025 may be configured to perform various functions as described above with respect to FIGS. 4-8.

According to some aspects, carrier aggregation circuitry 1030 determines which subset of the first subset of bandwidths and the second subset of bandwidths includes a primary component carrier. In some examples, carrier aggregation circuitry 1030 assigns the determined subset to the determined transceiver module having the highest signal quality metric. In some examples, the single transceiver module in the current configuration has a highest signal quality metric of the set of transceiver modules.

In some examples, the signal quality metric includes a signal to noise ratio (SNR) or signal to interference plus noise ratio (SINR). In some examples, signal measurement circuitry 1035 determines a transceiver module of the first transceiver module 1060 and the second transceiver module 1065 in the target configuration that has a highest signal quality metric. In some examples, signal measurement circuitry 1035 determines that a signal quality metric of the primary component carrier for the second transceiver module 1065 exceeds a signal quality threshold. In some examples, signal measurement circuitry 1035 determines that a signal quality metric of the primary component carrier for the second transceiver module 1065 exceeds a signal quality threshold. In some examples, signal measurement circuitry 1035 determines that a signal quality metric of the primary component carrier for the second transceiver module 1065 is below a signal quality threshold or that a temperature of the second transceiver module 1065 exceeds a temperature of the first transceiver module 1060. In some examples, the target configuration for the set of transceiver modules configures the first transceiver module 1060 to perform thermal mitigation.

According to some aspects, thermal mitigation circuitry 1040 performs thermal mitigation at the first transceiver module 1060 by disabling one or more antenna 1075 elements of the first transceiver module 1060.

Various components of communications device 1000 may provide means for performing the methods described herein, including with respect to FIGS. 4-8.

In some examples, means for transmitting or sending (or means for outputting for transmission) may include the transceivers 254 and/or antenna(s) 252 of the user equipment 104 illustrated in FIG. 2 and/or transceiver 1055 and antenna 1075 of the communication device 1000 in FIG. 10.

In some aspects, processing system 1005 may be implemented as part of controller/processor 280 of FIG. 2, and the various circuitries and codes may be implemented as part of thermal mitigation component 281.

Notably, FIG. 10 is just use example, and many other examples and configurations of communication device 1000 are possible.

Example Clauses

Implementation examples are described in the following numbered clauses:

Clause 1. A method, comprising: determining one or more operating temperatures of a user equipment; determining a target configuration for a plurality of transceiver modules based on the one or more operating temperatures; implementing the target configuration for the plurality of transceiver modules; and performing wireless communications according to the target configuration for the plurality of transceiver modules.

Clause 2. The method of Clause 1, wherein: the plurality of transceiver modules comprises a plurality of millimeter wave transceiver modules.

Clause 3. The method of any one of Clauses 1-2, further comprising: determining one or more updated operating temperatures of the user equipment; and implementing a previous configuration for the plurality of transceiver modules based on the one or more updated operating temperatures.

Clause 4. The method of any one of Clauses 1-3, wherein: the one or more operating temperatures of the user equipment comprise at least a transceiver junction temperature and a touch temperature of the user equipment, and the determining the target configuration for the plurality of transceiver modules based on the one or more operating temperatures comprises at least one of determining that a temperature of a transceiver module of the plurality of transceiver modules configured to perform the wireless communications using a primary component carrier exceeds a transceiver module temperature threshold or determining that a case temperature of the user equipment exceeds a case temperature threshold.

Clause 5. The method of Clause 4, wherein: a current configuration for the plurality of transceiver modules configures a single transceiver module of the plurality of transceiver modules to perform the wireless communications using a first subset of bandwidths and a second subset of bandwidths, and the target configuration for the plurality of transceiver modules configures a first transceiver module of the plurality of transceiver modules to perform the wireless communications on the primary component carrier using the first subset of bandwidths and a second transceiver module of the plurality of transceiver modules to perform the wireless communications on a secondary component carrier using the second subset of bandwidths.

Clause 6. The method of Clause 5, wherein: the first subset of bandwidths comprises relatively higher bandwidth component carriers and the second subset of bandwidths comprises relatively lower bandwidth component carriers.

Clause 7. The method of Clause 6, wherein the signal quality metric comprises one of a signal to noise ratio (SNR) or signal to interference plus noise ratio (SINR).

Clause 8. The method of Clause 5, further comprising: determining a transceiver module of the first transceiver module and the second transceiver module in the target configuration that has a highest signal quality metric; determining which subset of the first subset of bandwidths and the second subset of bandwidths includes a primary component carrier; and assigning the determined subset to the determined transceiver module having the highest signal quality metric.

Clause 9. The method of Clause 5, wherein: the single transceiver module in the current configuration has a highest signal quality metric of the plurality of transceiver modules.

Clause 10. The method of Clause 4, wherein: a current configuration for the plurality of transceiver modules configures a first transceiver module of the plurality of transceiver modules to perform the wireless communications using a first subset of bandwidths and a second transceiver module of the plurality of transceiver modules to perform the wireless communications using a second subset of bandwidths, the first subset of bandwidths includes the primary component carrier, and the target configuration for the plurality of transceiver modules configures one of the second transceiver module to perform the wireless communications using the first subset of bandwidths and the second subset of bandwidths; the first transceiver module to perform the wireless communications using the second subset of bandwidths and the second transceiver module to perform the wireless communications using the first subset of bandwidths; or at least one of the first transceiver module or the second transceiver module to perform thermal mitigation.

Clause 11. The method of Clause 10, further comprising: determining that a signal quality metric of the primary component carrier for the second transceiver module exceeds a signal quality threshold; determining that a temperature of the second transceiver module is below a temperature of the first transceiver module; determining that the temperature of the second transceiver module is below the transceiver module temperature threshold; and performing the wireless communication with second transceiver module using the first subset of bandwidths and the second subset of bandwidths, wherein the target configuration for the plurality of transceiver modules configures the second transceiver module to perform the wireless communications using the first subset of bandwidths and the second subset of bandwidths.

Clause 12. The method of Clause 10, further comprising: determining that a signal quality metric of the primary component carrier for the second transceiver module exceeds a signal quality threshold; determining that a temperature of the second transceiver module is below a temperature of the first transceiver module; determining that the temperature of the second transceiver module is above the transceiver module temperature threshold; and performing the wireless communication with second transceiver module using the second subset of bandwidths, wherein the target configuration for the plurality of transceiver modules configures the first transceiver module to perform the wireless communications using the second subset of bandwidths and the second transceiver module to perform the wireless communications using the first subset of bandwidths.

Clause 13. The method of Clause 10, further comprising: determining that a signal quality metric of the primary component carrier for the second transceiver module is below a signal quality threshold or that a temperature of the second transceiver module exceeds a temperature of the first transceiver module, wherein the target configuration for the plurality of transceiver modules configures the first transceiver module to perform thermal mitigation.

Clause 14. The method of Clause 13, further comprising performing thermal mitigation at the first transceiver module by disabling one or more antenna elements of the first transceiver module.

Clause 15: A processing system, comprising: a memory comprising computer-executable instructions; one or more processors configured to execute the computer-executable instructions and cause the processing system to perform a method in accordance with any one of Clauses 1-14.

Clause 16: A processing system, comprising means for performing a method in accordance with any one of Clauses 1-14.

Clause 17: A non-transitory computer-readable medium comprising computer-executable instructions that, when executed by one or more processors of a processing system, cause the processing system to perform a method in accordance with any one of Clauses 1-14.

Clause 18: A computer program product embodied on a computer-readable storage medium comprising code for performing a method in accordance with any one of Clauses 1-14.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by user equipments with service subscription. A pico cell may cover a relatively small geographic area (e.g., a sports stadium) and may allow unrestricted access by user equipments with service subscription. A femto cell may cover a relatively small geographic area (e.g., a home) and may allow restricted access by user equipments having an association with the femto cell (e.g., user equipments in a Closed Subscriber Group (CSG) and user equipments for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102 may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^{\mu} \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of interband thermal mitigation in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a–b, a–c, b–c, and a–b–c, as well as any combination with multiples of the same element (e.g., a–a, a–a–a, a–a–b, a–a–c, a–b–b, a–c–c, b–b, b–b–b, b–b–c, c–c, and c–c–c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communications at a user equipment (UE), comprising:
    a memory storing executable instructions;
    one or more processors configured to execute the instructions and cause the UE to:
        perform wireless communications according to a current configuration for a plurality of transceiver modules that configures a first transceiver module of the plurality of transceiver modules to perform wireless communications using a first subset of bandwidths and a second transceiver module of the plurality of transceiver modules to perform wireless communications using a second subset of bandwidths;
        determine one or more operating temperatures of the UE;
        determine a target configuration for the plurality of transceiver modules based on the one or more operating temperatures,
            wherein the target configuration is different from the current configuration,
            wherein the target configuration configures the second transceiver module to perform wireless communications using the first subset of bandwidths, and
            wherein the first subset of bandwidths includes a primary component carrier and the second subset of bandwidths includes a secondary component carrier; and
        perform wireless communications according to the target configuration for the plurality of transceiver modules.

2. The apparatus of claim 1, wherein the plurality of transceiver modules comprises a plurality of millimeter wave transceiver modules.

3. The apparatus of claim 1, wherein the target configuration configures the second transceiver module to perform wireless communications using the second subset of bandwidths.

4. The apparatus of claim 3, wherein the target configuration configures the second transceiver module to perform wireless communications using the first subset of bandwidths when the second transceiver module has a signal quality metric, in association with the second transceiver module performing wireless communications using the first subset of bandwidths, that exceeds a signal quality threshold, and wherein the target configuration configures the second transceiver module to perform wireless communications using the second subset of bandwidths when an operating temperature of the second transceiver module does not exceed a temperature threshold.

5. The apparatus of claim 1, wherein the target configuration configures the first transceiver module to perform wireless communications using the second subset of bandwidths.

6. The apparatus of claim 5, wherein the target configuration configures the second transceiver module to perform wireless communications using the first subset of bandwidths when the second transceiver module has a signal quality metric, in association with the second transceiver module performing wireless communications using the first subset of bandwidths, that exceeds a signal quality threshold, and wherein the target configuration configures the first transceiver module to perform wireless communications using the second subset of bandwidths when an operating temperature of the second transceiver module exceeds a temperature threshold.

7. The apparatus of claim 1, wherein:
the target configuration configures the second transceiver module to perform wireless communications using the first subset of bandwidths when the second transceiver module has a signal quality metric, in association with the second transceiver module performing wireless communications using the first subset of bandwidths, that exceeds a signal quality threshold; and
the one or more processors are configured to execute the instructions and cause the UE to determine an operating temperature of the second transceiver module, wherein the target configuration configures the second transceiver module to perform wireless communications using the second subset of bandwidths if the operating temperature of the second transceiver module does not exceed a temperature threshold, and the target configuration configures the first transceiver module to perform wireless communications using the second subset of bandwidths if the operating temperature of the second transceiver module exceeds the temperature threshold.

8. The apparatus of claim 1, wherein:
the target configuration configures the first transceiver module to perform thermal mitigation when the second transceiver module has a signal quality metric, in association with the second transceiver module performing wireless communications using the first subset of bandwidths, that does not exceed a signal quality threshold.

9. The apparatus of claim 1, wherein the one or more processors are configured to execute the instructions and cause the UE to determine a signal quality metric the second transceiver module has in association with performing wireless communications using the first subset of bandwidths, wherein:
if the signal quality metric exceeds a signal quality threshold, the target configuration configures the second transceiver module to perform wireless communications using the first subset of bandwidths; and
if the signal quality metric does not exceed the signal quality threshold, the target configuration configures the first transceiver module to perform thermal mitigation.

10. The apparatus of claim 1, wherein:
the current configuration configures the first transceiver module to perform wireless communications using the first subset of bandwidths based on determining the first transceiver module has a better signal quality metric than the second transceiver module in association with performing wireless communications using the first subset of bandwidths;
the current configuration configures the second transceiver module to perform wireless communications using the second subset of bandwidths based on determining the second transceiver module has a better signal quality metric than the first transceiver module in association with performing the wireless communications using the second subset of bandwidths; and
the target configuration configures the second transceiver module to perform wireless communications using the first subset of bandwidths when the second transceiver module has a signal quality metric, in association with the second transceiver module performing wireless communications using the first subset of bandwidths, that exceeds a signal quality threshold.

11. The apparatus of claim 10, wherein:
the target configuration configures the second transceiver module to perform wireless communications using the second subset of bandwidths if an operating temperature of the second transceiver module does not exceed a temperature threshold, and
the target configuration configures the first transceiver module to perform wireless communications using the second subset of bandwidths if the operating temperature of the second transceiver module exceeds the temperature threshold.

12. The apparatus of claim 1, wherein the target configuration is determined based on the one or more operating temperatures exceeding a temperature threshold.

13. The apparatus of claim 12, wherein the one or more operating temperatures comprise an operating temperature of the first transceiver module.

14. A method for wireless communications at a user equipment (UE), comprising:
performing wireless communications according to a current configuration for a plurality of transceiver modules that configures a first transceiver module of the plurality of transceiver modules to perform wireless communications using a first subset of bandwidths and a second transceiver module of the plurality of transceiver modules to perform wireless communications using a second subset of bandwidths;
determining one or more operating temperatures of the UE;
determining a target configuration for a plurality of transceiver modules based on the one or more operating temperatures,
wherein the target configuration is different from a current configuration,
wherein the target configuration configures the second transceiver module to perform wireless communications using the first subset of bandwidths, and
wherein the first subset of bandwidths includes a primary component carrier and the second subset of bandwidths includes a secondary component carrier; and performing wireless communications according to the target configuration for the plurality of transceiver modules.

15. The method of claim 14, wherein the plurality of transceiver modules comprises a plurality of millimeter wave transceiver modules.

16. The method of claim 14, wherein the target configuration configures the second transceiver module to perform wireless communications using the second subset of bandwidths.

17. The method of claim 16, wherein the target configuration configures the second transceiver module to perform wireless communications using the first subset of bandwidths when the second transceiver module has a signal quality metric, in association with the second transceiver module performing wireless communications using the first subset of bandwidths, that exceeds a signal quality threshold, and wherein the target configuration configures the second transceiver module to perform wireless communications using the second subset of bandwidths when an operating temperature of the second transceiver module does not exceed a temperature threshold.

18. The method of claim 14, wherein the target configuration configures the first transceiver module to perform wireless communications using the second subset of bandwidths.

19. The method of claim 18, wherein the target configuration configures the second transceiver module to perform wireless communications using the first subset of bandwidths when the second transceiver module has a signal quality metric, in association with the second transceiver module performing wireless communications using the first subset of bandwidths, that exceeds a signal quality threshold, and wherein the target configuration configures the first transceiver module to perform wireless communications using the second subset of bandwidths when an operating temperature of the second transceiver module exceeds a temperature threshold.

20. The method of claim 14, wherein:
the target configuration configures the second transceiver module to perform wireless communications using the first subset of bandwidths when the second transceiver module has a signal quality metric, in association with the second transceiver module performing wireless communications using the first subset of bandwidths, that exceeds a signal quality threshold; and
determining an operating temperature of the second transceiver module, wherein the target configuration configures the second transceiver module to perform wireless communications using the second subset of bandwidths if the operating temperature of the second transceiver module does not exceed a temperature threshold, and the target configuration configures the first transceiver module to perform wireless communications using the second subset of bandwidths if the operating temperature of the second transceiver module exceeds the temperature threshold.

21. The method of claim 14, wherein:
the target configuration configures the first transceiver module to perform thermal mitigation when the second transceiver module has a signal quality metric, in association with the second transceiver module performing wireless communications using the first subset of bandwidths, that does not exceed a signal quality threshold.

22. The method of claim 14, further comprising determining a signal quality metric the second transceiver module has in association with performing wireless communications using the first subset of bandwidths, wherein:
if the signal quality metric exceeds a signal quality threshold, the target configuration configures the second transceiver module to perform wireless communications using the first subset of bandwidths; and
if the signal quality metric does not exceed the signal quality threshold, the target configuration configures the first transceiver module to perform thermal mitigation.

23. The method of claim 14, wherein:
the current configuration configures the first transceiver module to perform wireless communications using the first subset of bandwidths based on determining the first transceiver module has a better signal quality metric than the second transceiver module in association with performing wireless communications using the first subset of bandwidths;
the current configuration configures the second transceiver module to perform wireless communications using the second subset of bandwidths based on determining the second transceiver module has a better signal quality metric than the first transceiver module in association with performing the wireless communications using the second subset of bandwidths; and
the target configuration configures the second transceiver module to perform wireless communications using the first subset of bandwidths when the second transceiver module has a signal quality metric, in association with the second transceiver module performing wireless communications using the first subset of bandwidths, that exceeds a signal quality threshold.

24. The method of claim 23, wherein:
the target configuration configures the second transceiver module to perform wireless communications using the second subset of bandwidths if an operating temperature of the second transceiver module does not exceed a temperature threshold, and
the target configuration configures the first transceiver module to perform wireless communications using the second subset of bandwidths if the operating temperature of the second transceiver module exceeds the temperature threshold.

25. The method of claim 14, wherein the target configuration is determined based on the one or more operating temperatures exceeding a temperature threshold.

26. The method of claim 25, wherein the one or more operating temperatures comprise an operating temperature of the first transceiver module.

* * * * *